(12) United States Patent
Myvett

(10) Patent No.: US 10,369,710 B2
(45) Date of Patent: Aug. 6, 2019

(54) GRAFTING KNIFE ASSEMBLY

(71) Applicant: Dennis Myvett, Los Angeles, CA (US)

(72) Inventor: Dennis Myvett, Los Angeles, CA (US)

( * ) Notice: Subject to any disclaimer, the term of this patent is extended or adjusted under 35 U.S.C. 154(b) by 328 days.

(21) Appl. No.: 15/366,779

(22) Filed: Dec. 1, 2016

(65) Prior Publication Data

US 2018/0154532 A1 Jun. 7, 2018

(51) Int. Cl.
*B26B 11/00* (2006.01)
*A47J 43/25* (2006.01)

(52) U.S. Cl.
CPC ............. *B26B 11/006* (2013.01); *A47J 43/25* (2013.01)

(58) Field of Classification Search
CPC .......... A47J 43/25; B26B 11/006; B26B 3/03; B26B 3/00; B26B 9/00; B26B 11/00; B21K 11/02; B22C 9/22; B22C 7/02; B22F 3/225; B22F 998/10; B22F 2003/244
USPC ...... 30/123, 348, 351, 346, 115, 279.2, 353, 30/355, 340, 342, 344; D7/650, 659, D7/652, 393, 395, 401.2, 642, 645, 653
See application file for complete search history.

(56) References Cited

U.S. PATENT DOCUMENTS

| | | | | |
|---|---|---|---|---|
| 1,051,499 A | * | 1/1913 | Hoeynck | A47J 43/255 241/273.3 |
| 1,376,704 A | * | 5/1921 | Koinzer | A47J 43/255 241/273.3 |
| 2,641,832 A | | 6/1953 | Champlin | |
| 2,740,195 A | | 4/1956 | Stadeli et al. | |
| 3,858,815 A | * | 1/1975 | Black | A47J 43/25 241/168 |
| D259,534 S | * | 6/1981 | Daenen | D7/678 |
| 4,281,460 A | | 8/1981 | Harris | |
| 4,420,298 A | * | 12/1983 | Mandrick | A21C 11/16 425/463 |
| D692,731 S | | 11/2013 | Solari | |
| D693,186 S | | 11/2013 | Hollinger | |
| 2014/0367500 A1 | | 12/2014 | Ho et al. | |
| 2015/0272396 A1 | | 10/2015 | Smith | |

FOREIGN PATENT DOCUMENTS

| | | | | |
|---|---|---|---|---|
| JP | 2011101778 A | * | 5/2011 | B26B 3/00 |
| WO | WO2012047881 | | 4/2012 | |

* cited by examiner

*Primary Examiner* — Ghassem Alie

(57) ABSTRACT

A grating knife assembly combining elements of a knife and a cheese grater includes a knife that is selectively manipulated thereby facilitating the knife to cut a food item. The knife has a blade and a handle. The blade is structured to selectively frictionally engage an object to abrade debris from the object.

3 Claims, 4 Drawing Sheets

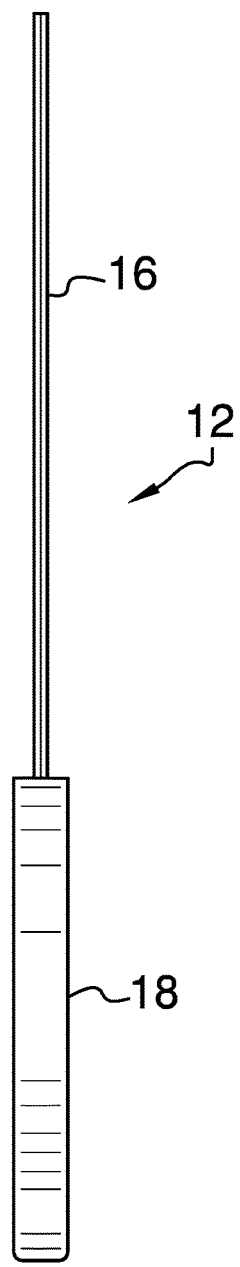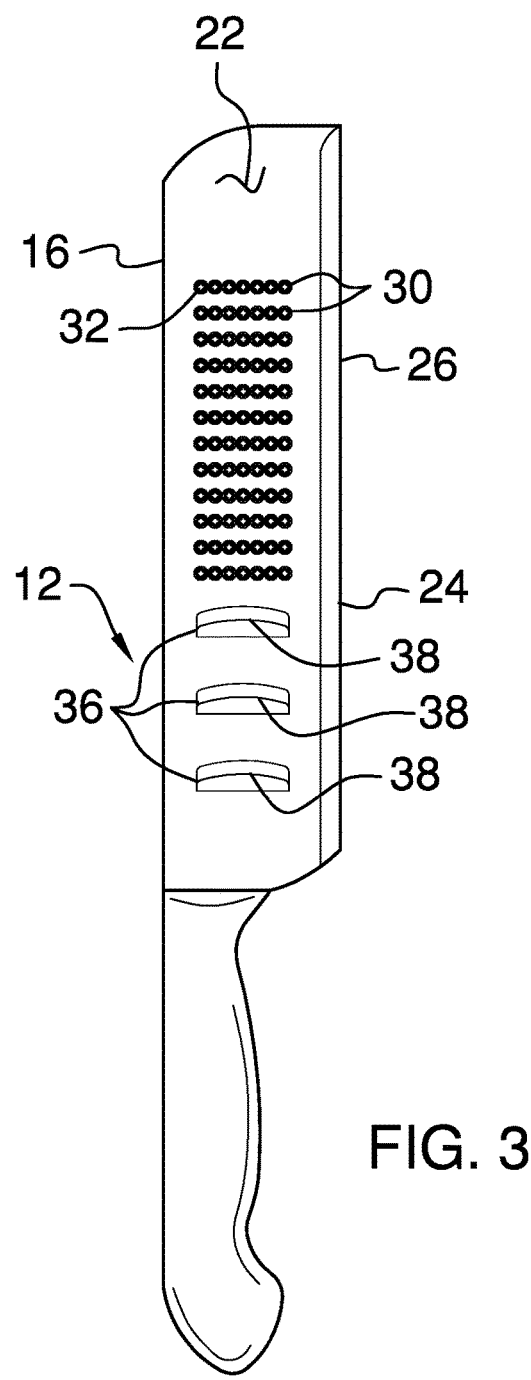

GRAFTING KNIFE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to knife devices and more particularly pertains to a new knife device combining elements of a knife and a cheese grater.

BRIEF SUMMARY OF THE INVENTION

An embodiment of the disclosure meets the needs presented above by generally comprising a knife that is selectively manipulated thereby facilitating the knife to cut a food item. The knife has a blade and a handle. The blade is structured to selectively frictionally engage an object to abrade debris from the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a bottom view of an embodiment of the disclosure.

FIG. 3 is a right side view of an embodiment of the disclosure.

DETAILED DESCRIPTION OF THE INVENTION

Figure 1:
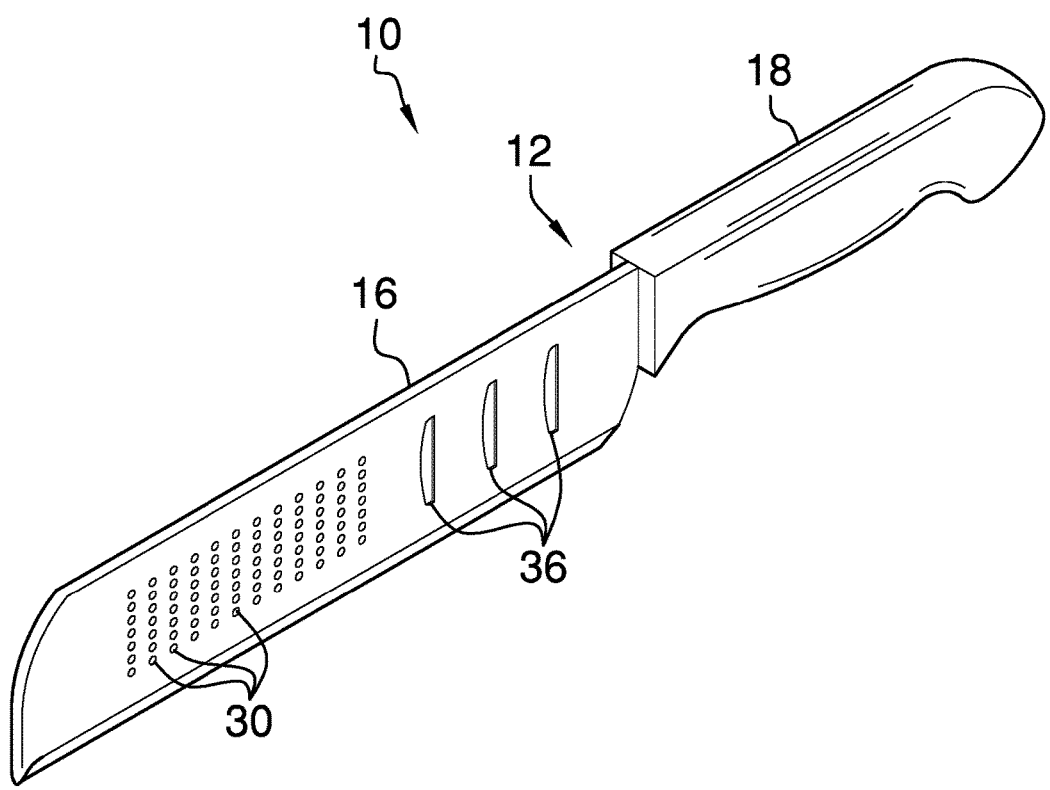
FIG. 1 is a top perspective view of a grating knife assembly according to an embodiment of the disclosure.
Figure 4:
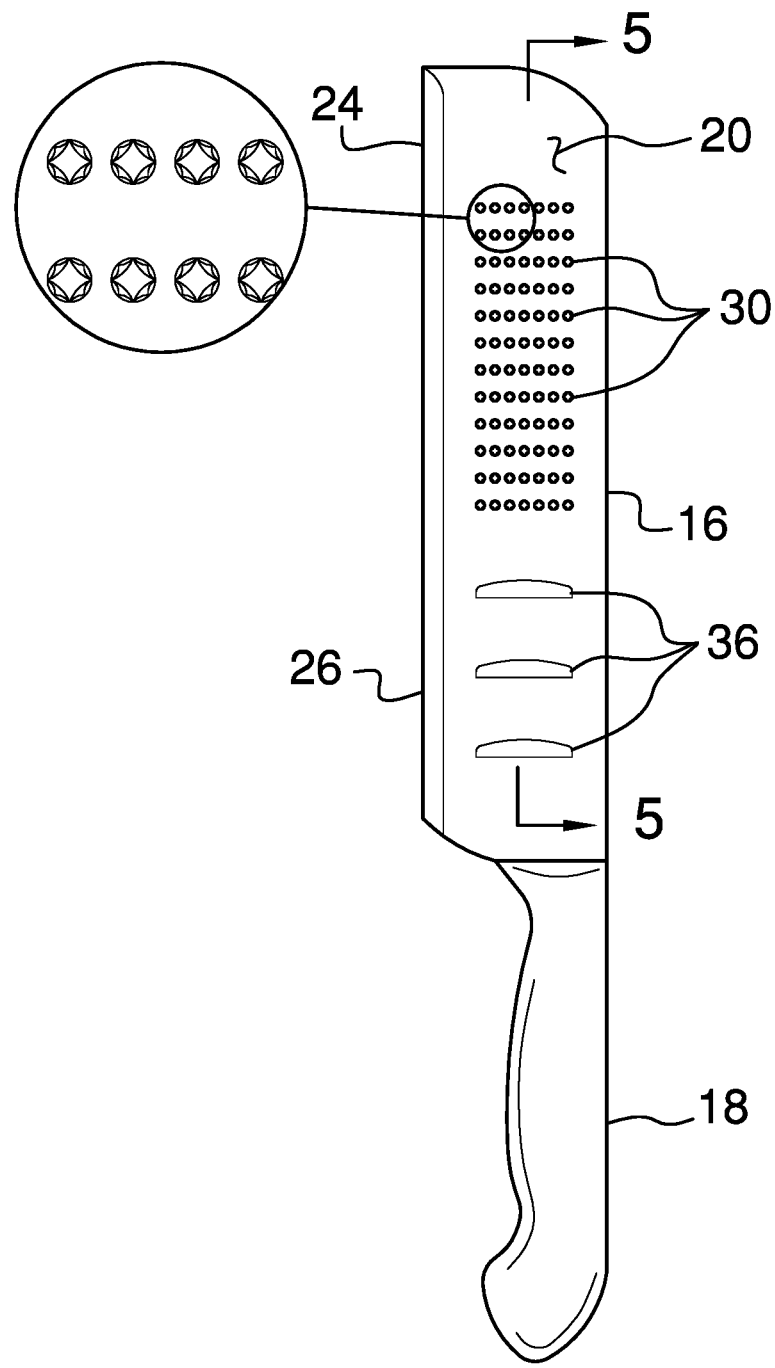
FIG. 4 is a left side view of an embodiment of the disclosure.
Figure 5:
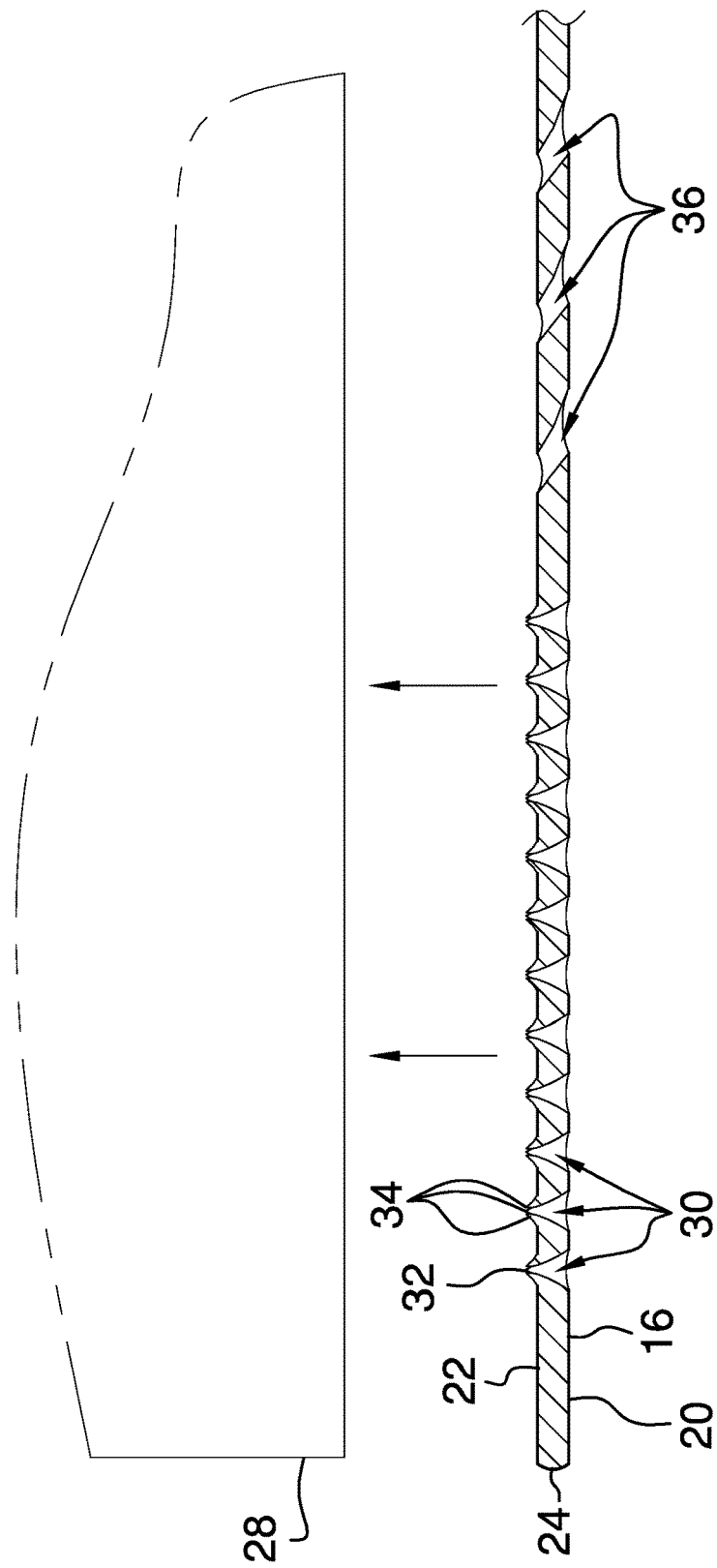
FIG. 5 is a cross sectional view taken along line 5-5 of FIG. 4 of an embodiment of the disclosure.

With reference now to the drawings, and in particular to FIGS. 1 through 5 thereof, a new knife device embodying the principles and concepts of an embodiment of the disclosure and generally designated by the reference numeral 10 will be described.

As best illustrated in FIGS. 1 through 5, the grating knife assembly 10 generally comprises a knife 12 that may be manipulated thereby facilitating the knife 12 to cut a food item 14. The knife 12 has a blade 16 and a handle 18. The blade 16 has a first surface 20, a second surface 22 and a peripheral edge 24 extending therebetween. The peripheral edge 24 has a bottom side 26 and each of the first surface 20 and the second surface 22 tapers to a point at the bottom side 26. Thus, the bottom side 26 may be sharpened. The blade 16 is structured to selectively frictionally engage an object 28 thereby facilitating the blade 16 to abrade debris from the object 28. The object 28 may be a block or cheese or other semi-solid food item 14.

The blade 16 has a plurality of punctures 30 and each of the punctures 30 extends through the first surface 20 and the second surface 22. Each of the punctures 30 has a bounding edge 32 and the bounding edge 32 corresponding to each of the punctures 30 tapers to a plurality of points 34. Thus, each of the points 34 corresponding to each of the punctures 30 abrades the debris from the object 28 the knife 12 is manipulate to frictionally engage the object 28. The debris may be shredded cheese or the like. The punctures 30 are spaced apart from each other and are arranged into a plurality of columns and rows.

The blade 16 has a plurality of slots 36 and each of the slots 36 extends through the first surface 20 and the second surface 22. The slots 36 are spaced apart from each other and are distributed between the punctures 30 and the handle 18. Each of the slots 36 is oriented perpendicular to the bottom side 26 of the blade 16 and each of the slots 36 has a first bounding edge 38. Each of the slots 36 and punctures 30 are spaced a distance ranging between 1.0 cm and 3.0 cm from the bottom side 26 of the blade 16. Thus, each of the slots 36 and punctures 30 is inhibited from contacting the food item 14 when the knife 12 is manipulated to cut the food item 14.

The first bounding edge 38 corresponding to each of the slots 36 faces the handle 18 and the first bounding edge 38 corresponding to each of the slots 36 is sharpened. The first bounding edge 38 corresponding to each of the slots 36 cuts the object 28 when the knife 12 is manipulated to position the slots 36 on the object 28. In this way the object 28 may be thinly sliced.

In use, the knife 12 is manipulated in the convention of knives to cut the food item 14. The knife 12 is selectively manipulated to position the second surface 22 against the object 28 and the knife 12 is urged back and forth on the object 28. In this way the points 34 corresponding to each of the punctures 30 abrades the debris from the object 28. The knife 12 is selectively manipulated to position each of the slots 36 on the object 28. The knife 12 is urged along the object 28 to facilitate the bounding edge 32 corresponding to each of the slots 36 to thinly slice the object 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grating knife assembly combining elements of a knife and a cheese grater, said assembly comprising:
    a knife being configured to be manipulated thereby facilitating said knife to cut a food item, said knife having a blade and a handle, said blade being structured to selectively frictionally engage an object wherein said blade is configured to abrade debris from the object, said blade having a planar first surface, a second surface and a peripheral edge extending therebetween, said peripheral edge having a bottom side, said blade being elongated extending away from said handle such that said bottom side of said blade is elongated, each of said first surface and said second surface tapering to a point at said bottom side wherein said bottom side is configured to be sharpened; and
    wherein said blade has a plurality of slots, each of said slots extending through said first surface and said second surface, said slots being spaced apart from each other, each of said slots being oriented perpendicular to said bottom side of said blade, each of said slots having a first bounding edge, said first bounding edge corresponding to each of said slots facing said handle, said first bounding edge corresponding to each of said slots being flush with said first surface of said blade and configured to cut the object thereby facilitating the object to be thinly sliced.

2. The assembly according to claim 1, wherein said blade has a plurality of punctures, each of said punctures extending through said first surface and said second surface.

3. A grating knife assembly combining elements of a knife and a cheese grater, said assembly comprising:
    a knife being configured to be manipulated thereby facilitating said knife to cut a food item, said knife having a blade and a handle, said blade having a planar first surface, a second surface and a peripheral edge extending therebetween, said peripheral edge having a bottom side, said blade being elongated extending away from said handle such that said bottom side of said blade is elongated, each of said first surface and said second surface tapering to a point at said bottom side wherein said bottom side is configured to be sharpened, said blade being structured to selectively frictionally engage an object wherein said blade is configured to abrade debris from the object, said blade having a plurality of punctures, each of said punctures extending through said first surface and said second surface, each of said punctures having a bounding edge, said bounding edge corresponding to each of said punctures tapering to a plurality of points wherein each of said points is configured to abrade the debris from the object, said blade having a plurality of slots, each of said slots extending through said first surface and said second surface, said slots being spaced apart from each other and being distributed between said punctures and said handle, each of said slots being oriented perpendicular to said bottom side of said blade, each of said slots having a first bounding edge, said first bounding edge corresponding to each of said slots facing said handle, said first bounding edge corresponding to each of said slots being flush with said first surface of said blade and configured to cut the object thereby facilitating the object to be thinly sliced.

* * * * *